P. G. Ross,
Universal Joint.

N° 76,819. Patented Apr. 14, 1868.

Witnesses: Inventor:
Jesse Zepp P. G. Ross per
James R. Fitch G. B. Towles

United States Patent Office.

P. G. ROSS, OF DAVENPORT, IOWA.

Letters Patent No. 76,819, dated April 14, 1868.

---

IMPROVEMENT IN SHAFT-COUPLING.

---

The Schedule referred to in these Letters Patent and making part of the same.

---

TO ALL WHOM IT MAY CONCERN:

Be it known that I, P. G. Ross, of the city of Davenport, in the county of Scott, and State of Iowa, have invented a new and useful Improvement in Shaft-Couplings; and I do hereby declare that the following is a full, clear, and exact description of the construction and operation of the same, reference being had to the accompanying drawings, making a part of this specification, in which—

Like letters in both figures of the drawings indicate like parts.

Figure 1:
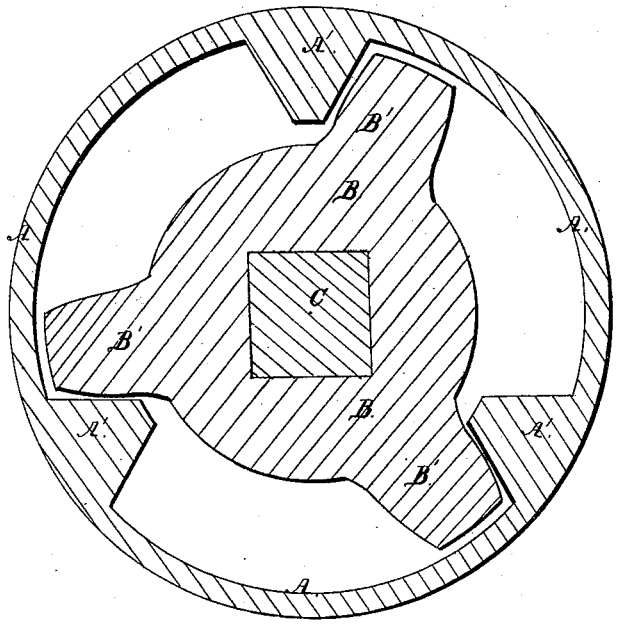
Figure 1 is a transverse sectional view of the coupling.
Figure 2:
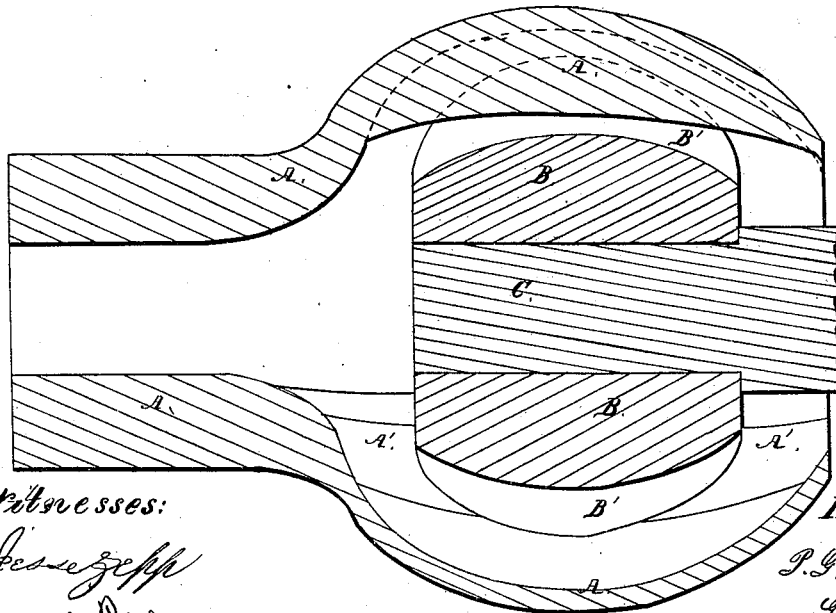
Figure 2 is a longitudinal sectional view.

The nature of my invention consists in a novel mode of constructing a coupling, whereby the shaft can be rotated at a more acute angle.

The said coupling having a spherical-shaped shell, whose surface internally forms a concave receptacle for a lubricator, which receptacle prevents the waste of said lubricator by dripping or running therefrom, either when said lubricator is a fluid at the moment of its application to the parts thereof, or when reduced to a fluid condition by the heat generated by the friction attendant upon its operation.

And furthermore, in the casting of the shell with three laterally V-shaped but longitudinal concave ribs or clutches projecting internally from the sides thereof, with a head moulded in the core and cast therein, a few lines smaller than said shell, which head has three convex longitudinal but laterally V-shaped ribs or clutches thereon projecting from the exterior thereof, and which head, like the shell, is perforated longitudinally for the reception of the shaft, the ribs or clutches of said head being designed to impinge against the internally-projecting ribs of the shell in a manner similar to the cogs of a cog-wheel and pinion, while affording ample space between said cogs to admit of any requisite deflection of the shaft attached to the head of the coupling.

The said head, being provided with three ribs or clutches only, will have a bearing when four will not; consequently a freer and easier angular movement will be given to the shaft from its bearing in the shell.

To enable any one skilled in the art to make and use my invention, I will proceed to describe its construction and operation.

A represents a spherical-shaped shell, open at either end thereof, and having three ribs or clutches A' constructed in the manner above described.

B represents the head, which is smaller than the shell, and located in the cavity thereof, and which resembles the shell in outward form, save the shell has internally-projecting concave longitudinal ribs or clutches, and that the head has externally-projecting convex longitudinal ribs or clutches B'.

The head is also perforated its entire length for the reception of a shaft, C, for the transmission of motion.

The head and shell are cast together. The head being cast within the cavity of the shell, and the projections of the head interlocking with the projections of the shell, cause the parts to move or rotate together upon motion being imparted to either, and the shaft can thus be run at a more acute angle, without danger of breaking.

This device is especially designed to obviate the difficulty which has hitherto obtained in the construction of a perfect coupling; for, while not being subject to the same strain to which a coupling is generally exposed, it is rendered less liable to wear through friction, and consequently less liable to be easily broken. To such exposure, more especially in threshing-machines, all such devices have long been subjected; for only by having the head cast in the shell, can a shape be obtained which at once permits the detention therein of oil or other lubricating-substance designed to prevent the friction and the wear of the parts, while economizing the power requisite for its operation; and it is obvious that the concave or spherical shape of the shell is peculiarly adapted for the retention therein of oil or other lubricating-matter.

Having thus fully described my invention, what I claim therein as new, and desire to secure by Letters Patent, is—

The spherical-shaped shell A, with the head B cast therein, substantially in the manner and for the purpose as herein set forth.

P. G. ROSS.

Witnesses:
 JNO. S. DAVIS,
 H. L. ROSS.